United States Patent [19]

Jarrin et al.

[11] Patent Number: 4,973,635
[45] Date of Patent: * Nov. 27, 1990

[54] COPOLYMER COMPOSITIONS PARTICULARLY USEFUL AS ADDITIVES FOR HYDROCARBON OILS

[75] Inventors: Jacques Jarrin; Magali Robine, both of Rueil-Malmaison; Jean-Pierre Durand, Chatou, all of France

[73] Assignee: Institut Francais Du Petrole, Rueil Malmaison, France

[*] Notice: The portion of the term of this patent subsequent to Nov. 21, 2006 has been disclaimed.

[21] Appl. No.: 284,877

[22] Filed: Dec. 15, 1988

Related U.S. Application Data

[63] Continuation-in-part of Ser. No. 60,785, Jun. 12, 1987, Pat. No. 4,882,404.

[30] Foreign Application Priority Data

Jun. 13, 1986 [FR] France ................. 86 08697

[51] Int. Cl.$^5$ ............................................. C08F 26/06
[52] U.S. Cl. .................................................. 526/261
[58] Field of Search ......................................... 526/261

[56] References Cited

PUBLICATIONS

Ahne et al., "Partielle Aminolyse von 2,4,6-Triallyloxy-s-triazine", *Synthesis*, Nov. 1974, pp. 182–186.

*Primary Examiner*—Joseph L. Schofer
*Assistant Examiner*—Alex H. Walker
*Attorney, Agent, or Firm*—Millen, White & Zelano

[57] ABSTRACT

New compositions, useful as viscosity additives, having dispersing properties in various hydrocarbon oils, are disclosed, which comprise:
   recurrent units derived from one or more acrylic or methacrylic esters (e.g. 55–99.8% by weight),
   recurrent units derived from one or more nitrogenous vinyl monomers obtained by reacting triallylcyanurate with aliphatic amines or polyamines (e.g. 0.2–10% by weight), and optionally
   recurrent units derived from one or more vinyl aromatic monomers (e.g. 0–35% by weight).

These copolymer compositions generally have a weight average molecular weight from 30,000 to 800,000 and a polydispersity generally lower than 5. They can be prepared by any radical copolymerization process using for example azoic or peroxydic initiators.

The copolymer compositions considered are used as additives for improving the rheological properties of hydrocarbon oils. In addition, they exhibit good dispersing properties.

14 Claims, No Drawings

COPOLYMER COMPOSITIONS PARTICULARLY USEFUL AS ADDITIVES FOR HYDROCARBON OILS

CROSS REFERENCE TO RELATED APPLICATIONS

This application is a continuation-in-part of application Ser. No. 060,785, filed June 12, 1987 now U.S. Pat. No. 4,882,404.

This invention concerns copolymer compositions particularly useful as additives for improving the rheological behavior of hydrocarbon oils (viscosity, pour point) and having dispersing properties.

BACKGROUND OF THE INVENTION

It is known to incorporate with conventional flow additives for hydrocarbon oils compounds which impart to them dispersing properties.

The different categories of so-called viscosity additives, particularly used in motor oil compositions (for improving the thickening power, the selectivity, the freezing point, the shearing strength, etc.) are disclosed in detail, for example, by J. BRIANT et al. in the work "Propriétés rhéologiques des lubrifiants" Editions TECHNIP, Paris.

The incorporation by copolymerisation, grafting, esterification or maleinization, of radicals carrying groups generally of the nitrogenous or oxygenated type, give dispersing properties to these additives. Accordingly, the dispersing additive amount required in the lubricating oil composition may be substantially reduced. The most currently used monomers for copolymerization or grafting are 4-vinyl pyridine, N-vinyl pyrrolidone and N-vinyl imidazole. The different compounds used to impart dispersing properties to viscosity additives are more exhaustively listed in the above-mentioned work.

The product obtained by reaction of one or more polyisobutene-succinimides with triazine trichloride (U.S. Pat. No. 4,116,875) is also known as dispersing additive.

Finally, it is known to prepare compounds of high nitrogen content, which may be used for stabilizing polyolefins by protecting them against hot oxidation ("*Synthesis*", pages 182–185, Mar. 1975), by aminolysis of triallylcyanurate with primary amines.

SUMMARY OF THE INVENTION

Now, new copolymer compounds have been discovered which offer very advantageous properties as additives in various hydrocarbon oils, as well by their action on the rheological properties of the oil as by their dispersing effect.

The copolymer compositions of the invention may be generally defined by the fact that they comprise recurrent units derived from one or more acrylic esters, from one or more monomers obtained by reaction of aliphatic amines or polyamines with triallylcyanurate, and optionally from one or more vinylaromatic monomers.

More particularly, the copolymer compositions of the invention, which may be prepared by radical copolymerization, contain 0–35% by weight of one or more vinylaromatic monomers, 55–99.8% by weight of one or more monomers of linear or branched alkyl acrylate or methacrylate type, comprising 1–22 carbon atoms, and from 0.2 to 10% by weight of one or more nitrogenous vinyl monomers derived from triallylcyanurate.

The proportion of these nitrogenous vinyl monomers is advantageously from 0.5 to 4% by weight, the proportions of the other monomers being correspondingly adjusted.

Nitrogenous vinyl monomers, the use of which in the preparation of the copolymers according to the invention is the main characteristic thereof, are prepared more particularly by reacting triallylcyanurate with one or more amines or polyamines complying with the general formula:

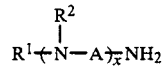

Wherein $R^1$ is a hydrogen atom or a linear or branched, saturated or unsaturated, monovalent aliphatic radical of 1–24 carbon atoms, x ranges from 1 to 10 or is zero when $R^1$ contains at least 4 carbon atoms, $R^2$, defined when x is not zero, is a hydrogen atom or a linear or branched monovalent aliphatic radical of 1–24 carbon atoms and A, also defined when x is not zero, is an alkylene radical, for example of 2–6 carbon atoms, more particularly an ethylene, propylene or isopropylene radical. When $R^1$ and $R^2$ are alkyl radicals, they may be denoted $C_nH_{2n+1}$ and $C_mH_{2m+1}$ respectively, each of n and m being 1–24, or zero when $R^1$ and $R^2$ are hydrogen atoms.

Examples of amines to be used are:

monoprimary saturated aliphatic monoamines of formula $R^1NH_2$, such for example as n-butylamine, sec-butylamine, tert-butylamine, n-pentylamine, 4-3 or 2-methyl-n-butylamine, n-heptylamine, n-octylamine, n-nonylamine, eicosylamine and docosylamine, as well as their isomers;

monoprimary unsaturated aliphatic monoamines of formula $R^1NH_2$, such for example as oleylamine;

monoprimary saturated aliphatic polyamines of formula

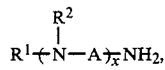

such for example as N,N-dimethyl ethylenediamine, N,N dimethyl diamino-propane, N,N-diethyl diamino-propane, N,N dimethyl diamino-isopropane, etc;

monoprimary unsaturated aliphatic polyamines of formula

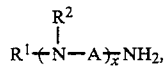

more particularly $R^1$—(NH—A)$_x$NH$_2$, such for example N-oleylpropane diamine (x=1), and corresponding amines with x=2 and x=3, etc;

biprimary polyamines of formula H—NH—A)$_x$NH$_2$, such for example as ethylene diamine, propylene diamine, diethylene triamine, dipropylene triamine, triethylene tetramine, tripropylene tetramine, tetraethylene pentamine, tetrapropylene pentamine, etc.

In the triallylcyanurate aminolysis reaction, the monoprimary or biprimary amines may be used, for example, in proportions from about 1 to 2 moles per mole of triallylcyanurate.

The reaction with 1 mole of amine may conform with the following scheme:

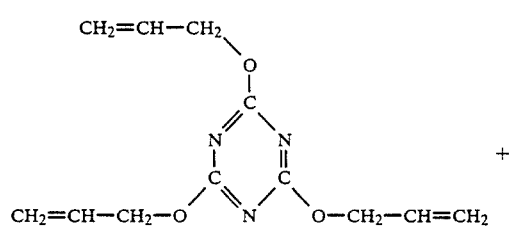

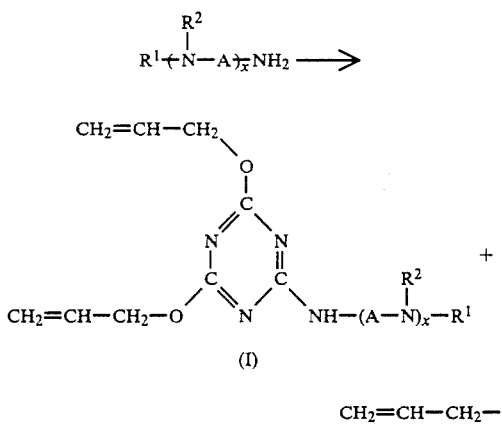

Optionally the reaction may be repeated with at least one part of product (I), according to the following scheme:

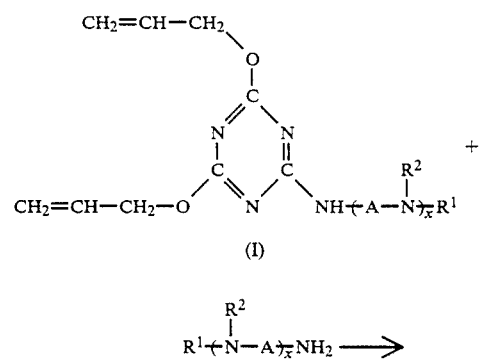

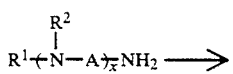

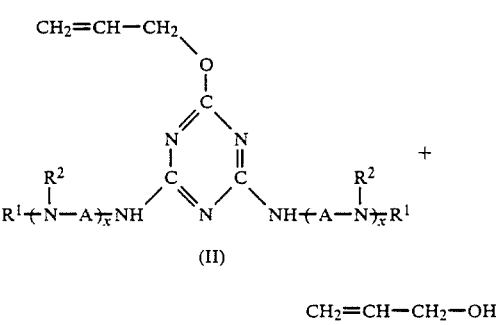

When using monoprimary ethylenically unsaturated amines $R^1$—$(NH-A)_{\overline{x}}NH_2$, the nitrogen-containing vinyl monomet may be represented by formulae:

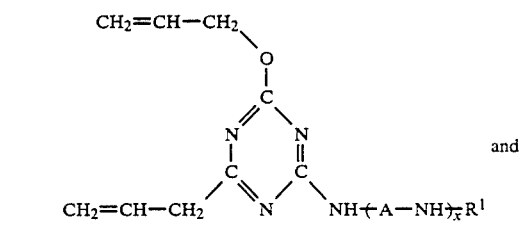

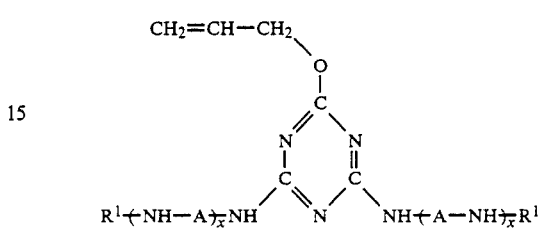

and wherein $R^1$ is at least one ethylenically unsaturated monovalent aliphatic radical of 1–24 carbon atoms radical, x ranges from 1 to 10, or is zero when $R^1$ contains at least 4 carbon atoms and A, defines when x is not zero, is an alkylene group of 2–6 carbon atoms. More particularly, x may be 1, 2 or 3, A trimethylene —$(CH_2)_{\overline{3}}$ and $R^1$ oleyl.

Moreover, for biprimary amines, the amine proportion may be, for example, about 0.5 mole per mole of triallylcyanurate and the reaction may comply with the following scheme:

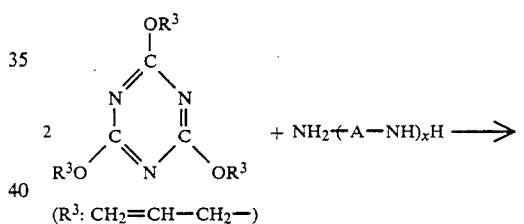

($R^3$: $CH_2$=CH—$CH_2$—)

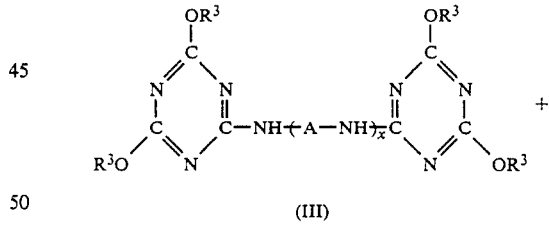

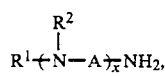

It may still be considered to react the so-obtained product with a monoprimary or biprimary amine $$R^1\text{—}(N\text{—}A)_{\overline{x}}NH_2,$$

in a proportion of about 1 to 3 moles per mole of product (III) as above-defined (i.e. about 0.5 to 1.5 moles per mole of initial triallylcyanurate).

The conditions of the triallylcyanurate aminolysis reaction are known. They have been disclosed in particular by H. AHNE et al. in "*Synthesis*", Mar. 1975, pages 182–185, the reactant proportions being adjusted according to the desired stoichiometry. Thus, the amino compound (monoprimary and/or biprimary) is used in such a proportion that, as a whole, at least one allyl double bond per molecule remains in each product obtained. Otherwise stated, the products comprising one triazine ring may be mono-or di-substituted and each of the products comprising two triazine rings may have two mono- or di-substituted rings, or even at most one of the two rings may be tri-substituted. In fact, the aminolysis of triallylcyanurate gives products having various substitution degrees which are difficult to separate. They may however be used as such in copolymerization, after removal by distillation of the allyl alcohol formed. Thus, mixtures of nitrogen-containing vinyl monomers may be used. Other mixtures of nitrogen-containing vinyl monomers that may be used are those resulting from reaction of triallylcyanurate with mixtures of amines both saturated and ethylenically unsaturated aliphatic amines, such as mixtures of monoprimary saturated and unsaturated aliphatic monoamines of the type $R^1-NH_2$, or mixtures of monoprimary saturated and unsaturated aliphatic polyamines of the type $R^1-(NH-A)_x-NH_2$ as described hereinabove. In that case, $R^1$ may contain 8–24, preferably 14–22 carbon atoms.

The acrylic ester involved in the formation of the copolymer compositions of the invention, consists more particularly of a linear or branched alkyl acrylate or methacrylate containing 1–22 carbon atoms in the alkyl portion, alkyl methacrylates being preferred.

The acrylic esters may be used alone or as mixtures. Thus, it is advantageous to use at least one relatively light alkyl methacrylate (e.g. whose alkyl group has 1–4 carbon atoms) and at least one relatively heavier alkyl methacrylate (e.g. whose linear alkyl group has 8–22 carbon atoms). More particularly, all the alkyl methacrylates may include about 5–25% by weight of at least one linear or branched $C_1$–$C_4$ alkyl methacrylate, about 10–80% by weight of at least one linear $C_8$–$C_{14}$ alkyl methacrylate and about 15–75% by weight of at least one linear $C_{16}$–$C_{22}$ alkyl methacrylate. The percentages by weight are indicated in proportion to the total amount of methacrylates.

The vinylaromatic monomer optionally involved may consist for example of styrene, α-methyl styrene or vinyltoluene, styrene being preferred.

The copolymer compositions of the invention may be prepared by radical copolymerization from monomers in suitable proportions.

The copolymerization is initiated by a conventional radical initiator such as those currently used in this type of polymerization (azoic or peroxidic compound).

The co-polymerization temperature ranges from 80° to 130° C., the solvent being for example a mineral oil (100 or 200N) used in an amount of 20–50% by weight in proportion to the reaction medium, taken as a whole.

The weight average molecular weight of the products according to the invention may range for example from 30,000 to 800,000 (as determined by chromatography by gel permeation calibrated with methyl polymethacrylate). Their polydispersity is generally lower than 5.

The copolymer compositions according to the invention are used as viscosity additives for mineral or synthetic lubricating oils. They are generally added in amounts ranging from 0.5 to 10% by weight in proportion to the lubricating oil.

EXAMPLES

The following examples are given to illustrate the invention and must not be considered as limiting the scope thereof.

Examples 29 to 34 are given for comparison purpose. Examples 1 to 13 describe the preparation of nitrogenous monomers derived from triallylcyanurate, used in the preparation of copolymers according to the invention.

EXAMPLES 1 to 13 (preparation of nitrogenous monomers)

10 g (40 millimoles) of triallylcyanurate (TAC) are reacted with the amine indicated in Tables 1 and 2 hereinafter, in the reported in Tables 1 and 3 molar amounts. The reactions are conducted in the absence of solvent at a temperature ranging from 40° to 70° C. for about 30 hours. It is operated in a rotating evaporator; allyl alcohol formed is distilled off under reduced pressure.

In the formulae of amines involved in examples 1 to 8, each of $R^1$ and $R^2$ may represent, respectively, a hydrogen atom or an alkyl radical of formula $C_nH_{2n+1}$ for $R^1$ and $C_mH_{2m+1}$ for $R^2$. The values for n and m are as indicated in Table 1. When $R^1$ (or $R^2$) represents a hydrogen atom, the value reported for n (or m) is zero.

TABLE 1

| example $N_o$ | Amino Compound $H_2N-(A-NR^2)_x R^1$ | | | | amount mmol | substitution degree of TAC |
|---|---|---|---|---|---|---|
| | x | n | m | -A- | | |
| 1 | 4 | 0 | 0 | —CH$_2$—CH$_2$— | 20 | 1.05 |
| 2 | 4 | 0 | 0 | —CH$_2$—CH$_2$— | 80 | 1.95 |
| 3 | 3 | 0 | 0 | —CH$_2$—CH$_2$— | 20 | 1.06 |
| 4 | 3 | 0 | 0 | —CH$_2$—CH$_2$— | 80 | 1.98 |
| 5 | 1 | 18 | 0 | —CH$_2$—CH$_2$—CH$_2$— | 80 | 1.8 |
| 6 | 1 | 1 | 1 | —CH$_2$—CH$_2$—CH$_2$— | 80 | 1.96 |
| 7 | 1 | 2 | 2 | —CH$_2$—CH$_2$—CH$_2$— | 80 | 1.95 |
| 8 | 0 | 18 | 0 | — | 80 | 1.95 |

For each of the products obtained, the substitution degree of triallylcyanurate has been determined from the amount of allyl alcohol recovered by vacuum distillation at the end of the reaction, by the ratio between the molar amount of allyl alcohol formed and 3 times the molar amount of TAC involved. As shown in table I, the selected molar proportions being taken into account, this average substitution degree may be close to 1 (products of examples 1 and 3 with 2 triallylcyanurate rings linked by substantially one biprimary amine molecule) or close to 2 (products having one triallylcyanurate ring substituted with about 2 molecules of monoprimary amine-examples 5 to 8-or with about 2 molecules of biprimary amine-examples 2 and 4).

In examples 9 to 13, amines of formula $R^1-(NH-(CH_2)_3)_x-NH_2$ are used, wherein $R^1$ and x are as indicated in Table 2 hereinafter. They are amine mixtures noted $A_1$, $A_2$, and $A_3$.

TABLE 2

| | AMINO COMPOUND $R^1 \pm NH(CH_2)_3 \frac{1}{x} NH_2$ | | | | | |
|---|---|---|---|---|---|---|
| | | Distribution of radicals $R^1$ | | | | Average molecular |
| REF. | x | $C_{14}$ | $C_{16}$ | $C_{18}^=$ | $C_{18}$ | $C_{20}$ | weight |
| $A_1$ | 1 | 2 | 30 | 40 | 25 | 3 | 360 |
| $A_2$ | 2 | — | 15 | 80 | 5 | — | 400 |
| $A_3$ | 3 | 2 | 30 | 40 | 25 | 3 | 455 |

The molar amounts of the various amine mixtures $A_1$, $A_2$ and $A_3$ used in examples 9 to 13 are as indicated in the following Table.

TABLE 3

| Example No. | Amino compound | Amount (m.mol) | Substitution degree of TAC |
|---|---|---|---|
| 9 | $A_1$ | 40 | 1.05 |
| 10 | $A_2$ | 40 | 1.05 |
| 11 | $A_2$ | 80 | 1.66 |
| 12 | $A_3$ | 40 | 1.03 |
| 13 | $A_3$ | 80 | 1.49 |

The products of examples 9, 10, and 12 are formed by substitution of about 1 allyl group of the triallylcyanurate by the monoprimary polyamine mixture involved in each case.

The products of examples 11 and 13 are likely complex mixture of non-reacted polyamine, mono and di-substituted triallylcyanurates. These products are used without any separation in the preparation of copolymers, as described in the examples which follow.

EXAMPLES 14 TO 34

Examples 14 to 28 describe the preparation of copolymer compositions according to the invention, using nitrogenous monomers prepared as described in examples 1 to 13, several methacrylates (methyl methacrylate -in short MMA-, lauryl methacrylate- in short LM-, and styrene methacrylate-, in short SM) and styrene in the proportions by weight indicated in Table 4. In examples 29 to 34, by way of comparison, various copolymers have been prepared without using nitrogenous monomers such as those involved in examples 14-28 or by using other nitrogenous monomers: N-vinylpyrrolidone (in short NVP), N- vinylimidazole (in short NVI), triallylcyanurate (in short TAC) and various combinations of these monomers. The proportions by weight of monomers involved in these comparative examples are also indicated in Table 4.

In these examples, "lauryl methacrylate" and "stearyl methacrylate", as used, are alkyl methacrylate cuts, respectively of 8-18 and 14-22 carbon atoms, whose composition by weight is as follows:

Lauryl methacrylate (in short LM)

13% (±2%) of $C_8$ alkyl methacrylate
16% (±2%) of $C_{10}$ alkyl methacrylate
29% (±2%) of $C_{12}$ alkyl methacrylate
21% (±2%) of $C_{14}$ alkyl methacrylate
14% (±2%) of $C_{16}$ alkyl methacrylate
7% (±2%) of $C_{18}$ alkyl methacrylate Stearyl methacrylate (in short SM)

2% (±2%) of $C_{14}$ alkyl methacrylate
51% (±2%) of $C_{16}$ alkyl methacrylate
30% (±2%) of $C_{18}$ alkyl methacrylate
14% (±2%) of $C_{20}$ alkyl methacrylate
3% (±2%) of $C_{22}$ alkyl methacrylate

TABLE 4

| Example No. | Nitrogen-containing monomer No. | % by weight | MMA % by weight | LM % by weight | SM % by weight | Styrene % by weight |
|---|---|---|---|---|---|---|
| 14 | 1 | 1 | 8 | 59 | 32 | 0 |
| 15 | 1 | 1 | 6 | 48 | 20 | 25 |
| 16 | 1 | 3.7 | 7 | 48.3 | 21 | 20 |
| 17 | 2 | 1 | 8 | 49 | 22 | 20 |
| 18 | 3 | 3.7 | 6 | 46.3 | 19 | 25 |
| 19 | 4 | 3.7 | 7 | 48.3 | 21 | 20 |
| 20 | 5 | 3.7 | 7 | 48.3 | 21 | 20 |
| 21 | 6 | 1 | 8 | 49 | 22 | 20 |
| 22 | 7 | 3.5 | 7 | 48.5 | 21 | 20 |
| 23 | 8 | 3.5 | 6 | 46.5 | 19 | 25 |
| 24 | 9 | 3 | 8 | 50 | 22 | 20 |
| 25 | 10 | 1 | 8 | 50 | 22 | 20 |
| 26 | 11 | 3 | 8 | 50 | 22 | 20 |
| 27 | 12 | 1 | 8 | 50 | 22 | 20 |
| 28 | 13 | 3 | 8 | 50 | 27 | 20 |
| 29* | — | 0 | 8 | 50 | 22 | 20 |
| 30* | NVP | 3.7 | 7 | 48.3 | 21 | 20 |
| 31* | 2NVP 1NVI | 3.7 | 7 | 48.3 | 21 | 20 |
| 32* | TAC | 1.7 | 8 | 49 | 21.3 | 20 |
| 33* | TAC | 3.7 | 7 | 48.3 | 21 | 20 |
| 34* | TAC+ 2NVP/1NVI | 3.7 2 | 7 | 47.3 | 20 | 20 |

*comparative examples

The weight molecular weights of the products range from 200,000 to 400,000 (as determined by chromatography by gel permeation calibrated with methyl polymethacrylate); the polydispersity of products of examples 14–28 ranges from 2.7 to 4.7.

Typical conditions for obtaining copolymers as described in examples 14 to 29, 32 and 33 are the following:

Into a heating reactor provided with mechanical stirring means, a vacuum port and a circulation of inert gas, are introduced:

| | | |
|---|---|---|
| Solvent: | 100 N oil | 25% by weight |
| Monomers | MMA<br>LM<br>SM<br>Styrene (except ex. 14)<br>nitrogenous comonomer<br>(except ex. 29) | 74.5% by weight<br>(distribution according<br>to table 2) |
| Radical initiator | (benzoyl peroxide) | 0.5% by weight. |

The reactor is thoroughly degased by subjecting it successively to a reduced pressure and to a light pressure of inert gas. The reactor is then heated to 100° C. for 5 hours under stirring; then the temperature is increased up to 130° C. for 2 hours, so as to complete the initiator decomposition and to polymerize monomer residues, if any.

The copolymer compositions of comparative examples 30, 31 and 34 are prepared according to an identical operating mode with introduction of NVP and as the case may be, NVI at the end of the polymerization.

EXAMPLE 35 (determination of the additive properties)

Various properties of the additives, prepared in examples 14 to 28 according to the invention and in comparative examples 29 to 34, are defined as follows:

(a) Thickening power (in short TP) of the additive. It is defined as the amount of additive to dissolve in a 200N oil for reaching the viscosity of 15 mm²/s at 100° C.

(b) Pour point of a 200N oil comprising a proportion of additive determined according to (a) and measured according to standard AFNOR T60 105.

(c) Shearing strength of 200N oil comprising the above additive proportion. It is determined by a test in ORBAHN injector according to standard DIN 51382 after 30 cycles; it is expressed by the relative loss of kinematic viscosity ($-\Delta n$ %).

(d) Additive dispersing power. The dispersing efficiency of the compositions according to the invention is evaluated by the dispersion spot test on filter paper, in the presence of carbonaceous material originating from Diesel engine used oil. The ratio between the respective diameters of the black spot and of the oil aureole is determined after 48 hours, the mixture being subjected, before deposition on filter paper, to different treatments.

The ratings retained for this test are the following:

| Sludge-spot diameter / oil-spot diameter | rating | dispersion |
|---|---|---|
| <32% | 0 | none |
| 32–39% | 1 | very low |
| 40–56% | 2 | poor |
| 57–68% | 3 | mean |
| 68–74% | 4 | good |
| ≧75% | 5 | very good |

The results of these determinations are indicated in the following tables 5 and 6.

TABLE 5

| Additive of example | TP % by weight | Pour point (°C.) | $-\Delta\eta$ % |
|---|---|---|---|
| 14 | 4.2 | −33 | 30 |
| 15 | 4.1 | −24 | 17 |
| 16 | 3.7 | −27 | 24 |
| 17 | 4.3 | −30 | 18 |
| 18 | 3.8 | −24 | 20 |
| 19 | 4.7 | −27 | 17 |
| 20 | 4.5 | −27 | 17 |
| 21 | 4.3 | −27 | 18 |
| 22 | 4.1 | −27 | 19 |
| 23 | 4.8 | −24 | 15 |
| 24 | 3.7 | −30 | 30 |
| 25 | 5.0 | −36 | 20 |
| 26 | 4.3 | −30 | 24 |
| 27 | 5.0 | −30 | 21 |
| 28 | 3.8 | −30 | 30 |
| 29* | 3.05 | −30 | 30 |
| 30* | 3.8 | −30 | 20 |
| 31* | 3.3 | −27 | 24 |
| 32* | 3.7 | −30 | 20 |
| 33* | 3.5 | −30 | 23 |
| 34* | 3.05 | −30 | 25 |

*Comparative examples

TABLE 6

| Additive of example | Dispersing efficiency | | | | | |
|---|---|---|---|---|---|---|
| | without H₂O | | | with H₂O | | |
| | 20° C. | 200° C./10' | 250° C./10' | 20° C. | 200° C./1' | 200° C./10' |
| 14 | 4 | 3 | 3 | 4 | 3 | 3 |
| 15 | 4 | 3 | 3 | 3 | 4 | 3 |
| 16 | 4 | 3 | 3 | 4 | 4 | 4 |
| 17 | 4 | 4 | 4 | 4 | 4 | 4 |
| 18 | 5 | 5 | 4 | 5 | 5 | 4 |
| 19 | 4 | 4 | 4 | 4 | 4 | 4 |
| 20 | 4 | 4 | 3 | 4 | 4 | 4 |
| 21 | 4 | 4 | 4 | 4 | 4 | 4 |
| 22 | 4 | 4 | 4 | 4 | 5 | 4 |
| 23 | 4 | 4 | 3 | 4 | 3 | 3 |
| 24 | 4 | 3 | 3 | 4 | 4 | 3 |
| 25 | 4 | 3 | 3 | 4 | 4 | 3 |
| 26 | 4 | 2 | 1 | 4 | 3 | 3 |
| 27 | 4 | 4 | 4 | 4 | 4 | 4 |
| 28 | 4 | 3 | 3 | 4 | 4 | 3 |
| 29* | 1 | 1 | 1 | 1 | 0 | 1 |
| 30* | 3 | 2 | 2 | 3 | 3 | 2 |
| 31* | 3 | 3 | 3 | 3 | 3 | 3 |

TABLE 6-continued

| Additive of example | Dispersing efficiency | | | | | |
|---|---|---|---|---|---|---|
| | without H₂O | | | with H₂O | | |
| | 20° C. | 200° C./10' | 250° C./10' | 20° C. | 200° C./1' | 200° C./10' |
| 32* | 2 | 1 | 1 | 2 | 1 | 1 |
| 33* | 2 | 1 | 1 | 2 | 1 | 1 |
| 34* | 3 | 3 | 3 | 3 | 3 | 3 |

*Comparative examples

According to Table 6, it appears that, under the test conditions selected and for the indicated distributions of methacrylic and styrenic recurrent units, the incorporation of nitrogeneous monomers with the preparation of the copolymers according to the invention gives good dispersing properties to the resultant additives.

Example 29 shows that the copolymer prepared in the absence of nitrogeneous monomer has but a very low dispersing efficiency. Examples 30 and 31 relate to copolymers grafted according to conventional techniques with the usual NVP and NVI monomers.

Examples 32 and 33 show the very low efficiency of triallylcyanurate when incorporated as such with the additive.

Example 34 relates to a copolymer prepared by grafting a mixture of ⅔ NVP and ⅓ NVI on a copolymer such as that of example 33. The previous incorporation of TAC does not improve the dispersing efficiency obtained by introduction of the mixture of NVP and NVI at the end of the polymerization (compare with example 31).

Examples 14 to 28 relate to copolymers according to the invention and illustrate the variety of possible structures of nitrogenous monomer characterizing the invention and of copolymer compositions including it.

EXAMPLE 36

In order to ascertain that the dispersing efficiency depends effectively on the nitrogenous groups fixed on the polymer, the products of examples 16, 20 and 21 have been treated by dialysis for removing the monomers which were not copolymerized or the polymers of low molecular weight.

The dialysis is performed by using as the solvent, cyclohexane at reflux. After separation, the polymer fraction is precipitated into methanol, dried and again dissolved into 200N oil.

After dialysis, it appears that the polymer of high molecular weight amounts to more than 95% by weight of the monomers initially introduced and that the dispersing efficiency of the polymer after dialysis is identical to that of the initial polymer solution.

What is claimed as the invention is:

1. A copolymer composition, comprising (a) recurrent units derived from at least one acrylic or methacrylic ester; (b) recurrent units derived from at least one nitrogeneous vinyl monomer obtained by reacting triallylcyanurate with at least one monoprimary aliphatic amine complying with the general formula:

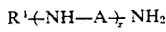

wherein $R^1$ is at least one ethylenically unsaturated monovalent aliphatic radical, x ranges from 1 to 10 or may be a zero when $R^1$ contains at least 4 carbon atoms and A is an alkylene group of 2-6 carbon atoms, said at least one monoprimary aliphatic amine being used in a proportion of 1 to 2 moles per mole of triallylcyanurate; and optionally (c) recurrent units derived from at least one vinyl aromatic monomer.

2. A copolymer composition according to claim 1, wherein said vinylaromatic monomer is styrene.

3. A copolymer composition according to claim 1, wherein said acrylic or methacrylic ester consists of at least one linear or branched alkyl acrylate having 1 to 22 carbon atoms in the alkyl group.

4. A copolymer compositor according to claim 1, wherein said at least one nitrogeneous vinyl monomer in part comprises at least one compound obtained by reacting triallylcyanurate with at least one monoprimary aliphatic amine complying with the general formula:

wherein $R^1$ is at least one alkyl radical of 8-24 carbon atoms, x ranges from 0 to 10 and A, defined when x is not zero, is an alkylene group of 2-6 carbon atoms.

5. A copolymer composition according to claim 1, wherein said acrylic or methacrylic ester is used in a proportion from 55 to 99.8% by weight, said nitrogenous vinyl monomer is used in a proportion 0.2 to 10% by weight, and said vinylaromatic monomer is used in a proportion of not more than 35% by weight, with respect to the total weight of said monomers.

6. A copolymer composition according to claim 1, wherein said monomer (b) is present in a concentration of 0.5–4% by weight and said vinyl aromatic monomer is styrene in a proportion of above 0% by weight.

7. A copolymer composition according to claim 1, having a weight average molecular weight from about 30,000 to 800,000 and a polydispersity lower than 5.

8. A copolymer composition according to claim 1, having a weight average molecular weight from about 200,000–400,000 and a polydispersity of 2.7–4.7.

9. A copolymer composition according to claim 1, wherein said nitrogenous vinyl monomer results from the reaction of said monoprimary aliphatic amine with triallylcyanurate with removal of the allyl alcohol formed.

10. A copolymer composition according to claim 1 wherein said nitrogenous vinyl monomer is at least one obtained with a monoprimary aliphatic amine of formulae

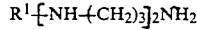

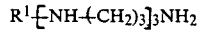

wherein $R^1$ is an ethylenically unsaturated monovalent aliphatic radical.

11. A copolymer composition according to claim 10 wherein, in the formulae, $R^1$ is oleyl.

12. A copolymer composition comprising:

(a) 55 to 99.8% by weight of least one linear or branched alkyl acrylate or methylacrylate having 1-22 carbon atoms in the alkyl group;

(b) 0.2-10% by weight of at least one nitrogenous vinyl monomer of formula

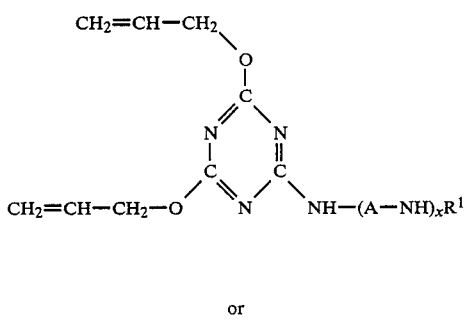

(I)

or $$\underset{R^1+NH-A\xrightarrow{}_xNH}{\underset{|}{\overset{CH_2=CH-CH_2}{\underset{|}{\overset{O}{\underset{C}{\parallel}}}}}}\underset{N}{\overset{N}{\underset{\parallel}{\overset{}{C}}}}NH+A-NH\xrightarrow{}_xR^2$$ (II)

wherein $R^1$ is at least one ethylenically unsaturated monovalent aliphatic radical of 1-24 carbon atoms radical, x ranges from 1 to 10 or is zero when $R^1$ contains at least 4 carbon atoms and A, defined when x is not zero, is an alkylene group of 2-6 carbon atoms; and (c) 0-35% by weight of a vinyl aromatic monomer.

13. A polymer composition according to claim 12, wherein in the formulae x is 1, 2 or 3, A is $-(CH_2)_3$ and $R^1$ is oleyl.

14. A copolymer composition according to claim 12 wherein said at least one nitrogenous vinyl monomer in part comprises at least one compound of formula (I) or (II) wherein $R^1$ is at least one alkyl radical of 8-24 carbon atoms, x ranges from 0 to 10, and A, defined when x is not zero, is an alkylene group of 2-6 carbon atoms.

* * * * *